N. H. KING.
SEWER TRAP.
APPLICATION FILED MAR. 28, 1913.
1,156,907.
Patented Oct. 19, 1915.
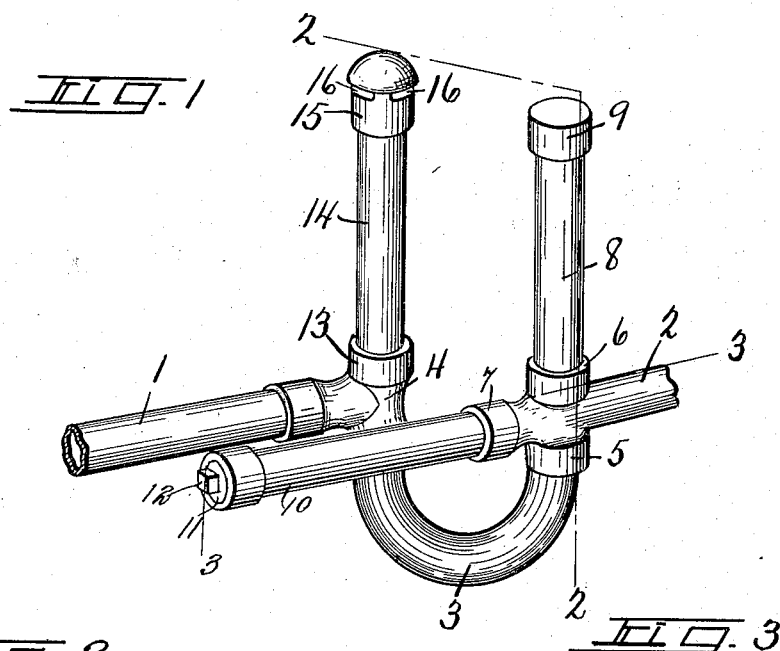
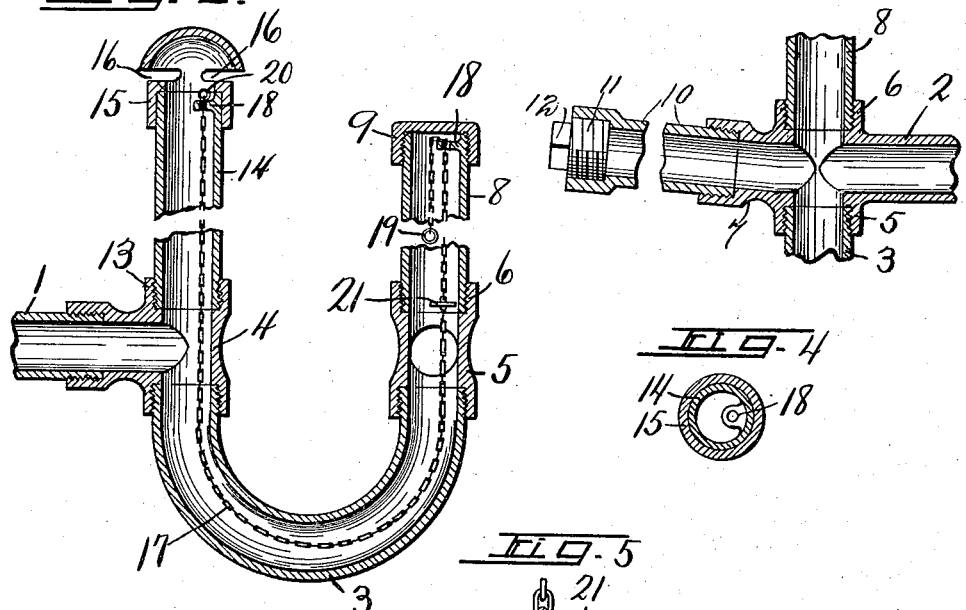
WITNESSES:
H. Hurst,
E. A. Thompson
INVENTOR.
Nathan H. King
BY
Howard P. Denison
ATTORNEY.

UNITED STATES PATENT OFFICE.

NATHAN H. KING, OF SOLVAY, NEW YORK.

SEWER-TRAP.

1,156,907.

Specification of Letters Patent.  Patented Oct. 19, 1915.

Application filed March 28, 1913.  Serial No. 757,334.

*To all whom it may concern:*

Be it known that I, NATHAN H. KING, of Solvay, in the county of Onondaga, in the State of New York, have invented new and useful Improvements in Sewer-Traps, of which the following, taken in connection with the accompanying drawings, is a full, clear, and exact description.

This invention relates to certain improvements in sewer traps and more particularly to that class of sewer traps having an inlet and a discharge pipe, the adjacent ends of which are connected by a curved joint adapted to lie below the plane of the inlet and discharge pipes so that the joint will remain substantially full of the fluid and form a liquid seal preventing the passage of gas through the trap.

The object of my invention is to construct a simple, durable and inexpensive trap which shall be highly efficient for the purpose designed.

Another object is to provide means for readily cleansing the portion of the trap lying below the plane of the inlet and discharge pipes.

A further object is to so construct the trap that the inlet and discharge pipes will lie in different vertical planes and the curved joint connecting them shall lie in a vertical plane diagonally disposed to the planes of the inlet and discharge pipes so that a cleaning port will open directly into the discharge pipe and a cleaning pipe may be fitted in this port and will lead directly into the discharge pipe without interfering with or contacting with the inlet pipe.

Other objects and uses will appear from the following description.

In the drawings, Figure 1 is a perspective view of the trap. Fig. 2 is a cross section on line 2—2, Fig. 1, showing the inlet pipe and its union turned sufficiently far so as to appear in section. Fig. 3 is a cross section on line 3—3, Fig. 1. Fig. 4 is a cross section through the vent pipe showing the means for supporting the flexible cleaning chain. Fig. 5 shows the means for attaching washers to the cleaning chain.

In order that my invention may be clearly understood, I have shown an inlet pipe —1— and an outlet pipe —2— and a substantially U-shaped pipe —3— connected to the adjacent ends of these pipes by the unions —4— and —5— respectively. This pipe —3— is somewhat diagonally disposed with respect to the vertical planes of the pipes —1— and —2— so that these pipes —1— and —2— extend substantially parallel with each other, but lie in different vertical planes.

The union —5— is provided with a plurality of ports having circumferentially extending shoulders —6— and —7—.

The circumferential shoulder —6— is internally threaded for receiving an upright pipe —8— externally threaded at each of its ends. The upper portion of the pipe is adapted to receive an externally threaded cap —9—.

The circumferentially extending shoulder —7— opens directly into, and is axially alined with, and extends in the opposite direction from the discharge pipe —2— and is internally threaded for receiving a cleaning pipe —10— having one of its ends externally threaded. The other end is somewhat enlarged radially and internally threaded for receiving a plug —11— having a nut —12— formed integral therewith. This pipe —10— preferably inclines upwardly from the horizontal a sufficient degree so as to prevent any back-flow from the discharge pipe —2— or union —6— therethrough.

The union —4— is formed with a port opening upwardly and having a circumferentially extending shoulder —13— internally threaded for receiving a vent pipe —14— having a portion of one of its ends threaded for coaction therewith, the other end is adapted to receive a vent cap —15— having openings —16— therein.

Traps of this nature are usually placed directly outside the wall of the house and the pipe —10— is adapted to extend through and into the cellar so that the joint between the discharge pipe —2— and the U-shaped pipe —3— may be readily cleaned from the cellar by simply removing the plug —11— and inserting an instrument adapted for the purpose.

It is readily apparent that the sewage will pass through the inlet pipe —1— into the pipe —3— and be discharged through the pipe —2—, but that a portion of the pipe —3— will always remain filled with the fluid so as to form a liquid seal to prevent the flow of gases through the trap.

The pipes —8— and —14— are adapted to extend above the ground or in some place of easy access for the purpose next described. Within these pipes and extending around through the U-shaped pipe —3— is a flexible link or chain —17— adapted to pass through the ears —18— formed upon the walls of the pipe —8— and —14— respectively and is prevented from removal by the rings —19— and —20—. This chain is preferably provided with a disk —21— so positioned upon the chain —17— that when the ring —20— contacts with its ear —18—, the disk will lie above the opening into the discharge pipe —2—, the chain being of sufficient length so that the disk —21— may readily be pulled around through the U-shaped pipe —3— for cleansing the pipe of any refuse matter. The pipe —14— and its cap —15— also act as a vent for any gases which may arise from the fluid confined in the U-shaped pipe —3—.

It is readily apparent that the pipe —3— may extend at any angle with respect to the direction of the inlet or outlet pipe, but preferably it extends as nearly in the direction of the flow of the fluid through the pipe as is consistent with the use of the cleaning pipe —10— extending along side thereof and that the pipes shown may be of any length and size without departing from the spirit of my invention.

What I claim is:

In a sewer trap, a U-shaped tubular section, a three-way union connected to one end of said section, an inlet pipe connected to said union, a clean-out pipe connected to said union and extending vertically from the union and in substantial alinement with the adjacent portion of the U-shaped section, a four-way union connected to the other end of said U-shaped section, an outlet pipe connected to said union, a clean-out pipe connected to said union and vertically disposed and in substantial alinement with the adjacent end of the U-shaped section and a second clean-out pipe connected to said union and in substantial alinement with the outlet pipe and upwardly inclined as it extends from said union, and separate closures for said clean-out pipes.

In witness whereof I have hereunto set my hand this 14th day of March, 1913.

NATHAN H. KING.

Witnesses:
E. A. THOMPSON,
VIOLA HOWLAND.

Copies of this patent may be obtained for five cents each, by addressing the "Commissioner of Patents, Washington, D. C."